US005495809A

United States Patent [19]
Carbo

[11] Patent Number: 5,495,809
[45] Date of Patent: Mar. 5, 1996

[54] MOVABLE PLATFORM HAVING REMOVABLE WHEELS FOR ORIENTATION CHANGING

[76] Inventor: Paul L. Carbo, P.O. Box 295, Northford, Conn. 06472

[21] Appl. No.: 334,962

[22] Filed: Nov. 7, 1994

[51] Int. Cl.$^6$ .......................... B61D 15/00; B61F 3/16; B61F 5/28
[52] U.S. Cl. .................. 105/157.1; 105/177; 105/180; 105/218.1; 105/220; 16/40; 295/43; 280/47.34; 301/111; 238/10 R
[58] Field of Search ............................. 105/157.1, 177, 105/179, 180, 211, 218.1, 220; 16/18, 29, 30, 32, 40, 45, 47; 295/43; 280/47.34; 301/111, 121; 238/10 R

[56] References Cited

U.S. PATENT DOCUMENTS

| 678,413 | 7/1901 | Leyland | 301/111 |
|---|---|---|---|
| 1,342,281 | 6/1920 | Foreman | 238/10 R |
| 2,521,660 | 9/1950 | Westover | 105/180 |
| 3,408,950 | 11/1968 | Puhringer | 105/180 |
| 4,077,644 | 3/1978 | Roby et al. | 280/47.34 |
| 4,522,297 | 6/1985 | Jaegers | 198/774.1 |
| 4,876,785 | 10/1989 | Driggers | 29/426.3 |
| 4,930,937 | 6/1990 | Fulton | 16/32 |
| 5,105,741 | 4/1992 | Leary | 104/106 |

FOREIGN PATENT DOCUMENTS

| 808626 | 2/1937 | France | 16/40 |
|---|---|---|---|

Primary Examiner—Robert J. Oberleitner
Assistant Examiner—S. Joseph Morano
Attorney, Agent, or Firm—Edward R. Hyde

[57] ABSTRACT

A movable platform or dolly for supporting heavy equipment in which the dolly rolls on tracks. Track sections are located under the dolly and additional sections can be attached to extend the track.

7 Claims, 5 Drawing Sheets

MOVABLE PLATFORM HAVING REMOVABLE WHEELS FOR ORIENTATION CHANGING

BACKGROUND OF THE INVENTION

1. Field of the Invention

The present invention relates to a movable platform and in particular a platform suitable for supporting and moving heavy equipment such as business machinery and medical imaging equipment.

Machinery and apparatus of the type supported by the platform of the present invention is customarily found in offices, laboratories, and other locations in which it may be located against walls, in corners of other areas that are difficult to access. The present invention is designed to support equipment in such areas and to provide convenient movement thereof for ready accessability. This is accomplished by a movable platform and novel wheel and track design that permits the supported equipment to be conveniently moved to an accessible location.

2. Description of the Prior Art

The design of the present invention pertains to movable dollies of the type that will move heavy equipment. It is especially designed to continually support the equipment that may be located in corners or other relatively inaccessible locations and to provide for the convenient movement of the equipment for move accessibility to permit repair.

Movable platforms or dollies of various types are, of course, well-known and examples of these are disclosed in U.S. Pat. Nos. 4,522,297; 4,876,785 and 5,105,741. Of these and other patents and prior art dollies for particular uses none of them provide the utility of the present invention in which business machinery and medical imaging equipment for example may be conveniently moved at desired angles from relatively inaccessible locations. It is contemplated that the present design will provide a permanent platform for the apparatus to be supported and when it is desirable to service or otherwise access the apparatus the dolly or movable platform will be moved in an appropriate, predetermined direction to a location to permit servicing.

SUMMARY OF THE INVENTION

The invention provides a strong, lightweight platform supported on rollers, designed to ride on tracks that are provided and oriented in a predetermined direction so that the apparatus may be conveniently moved. The tracks are segmented so that short sections are permanently located under the dolly in its location on the premises and additional sections are provided when it is desired to move the apparatus. The rollers or wheels that support the dolly have a unique mounting arrangement so that the roller may be oriented in a predetermined direction in accordance with the location and accessibility orientation of the apparatus that is being supported.

Against the foregoing background it is the primary object of the present invention to provide a movable platform for apparatus such as medical imaging equipment and business machines that will conveniently move the apparatus from a relatively inaccessible location to one of accessibility.

It is a further object of the present invention to provide a movable dolly which is supported on track segments adapted to be extended by additional segments in a predetermined direction when it is desired to move the supported apparatus to an accessible location.

It is a still further object of the present invention to provide a dolly with a plurality of rollers that may be conveniently oriented in a predetermined direction for movement of supported apparatus.

BRIEF DESCRIPTION OF THE DRAWINGS

The foregoing and still other objects and advantages of the present invention will be more apparent from the following detailed explanation of the preferred embodiments of the invention considered in connection with the accompanying drawings herein in which.

DESCRIPTION OF THE PREFERRED EMBODIMENT

Figure 1:
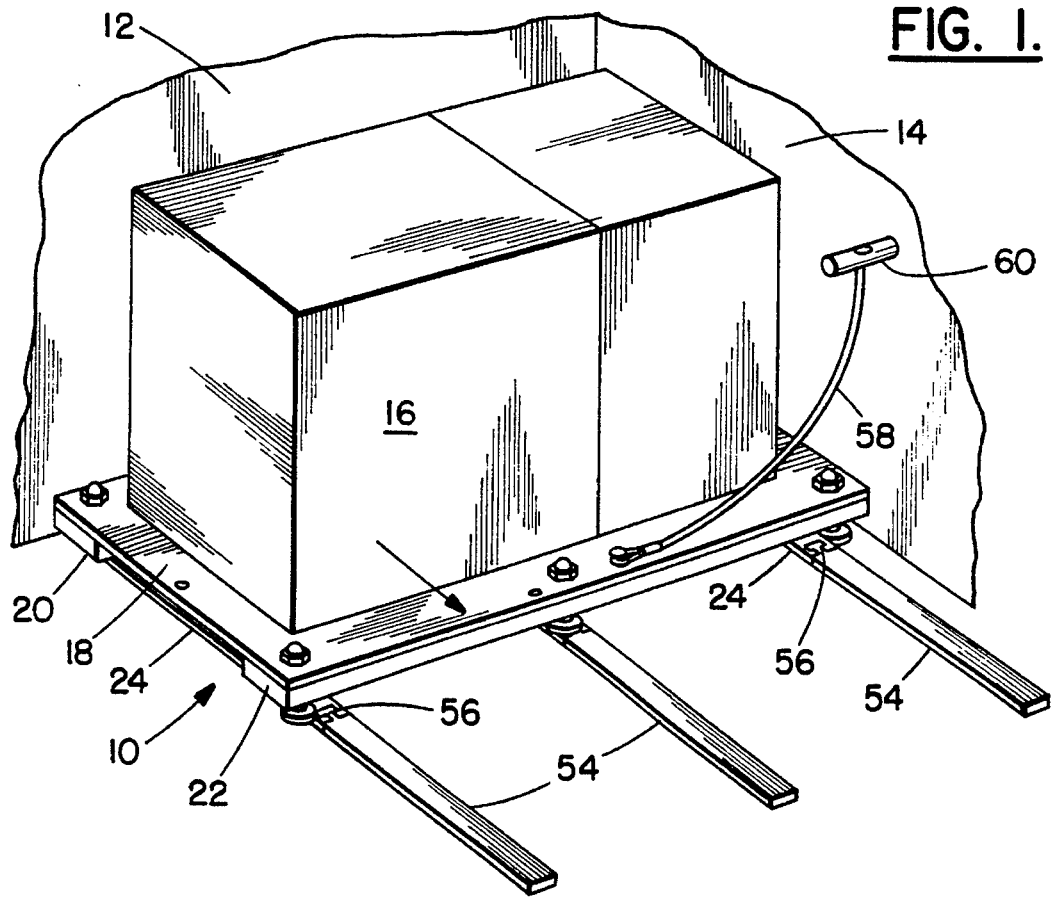
FIG. 1 is a perspective view of the movable platform of the present invention supporting certain apparatus.
Figure 2:
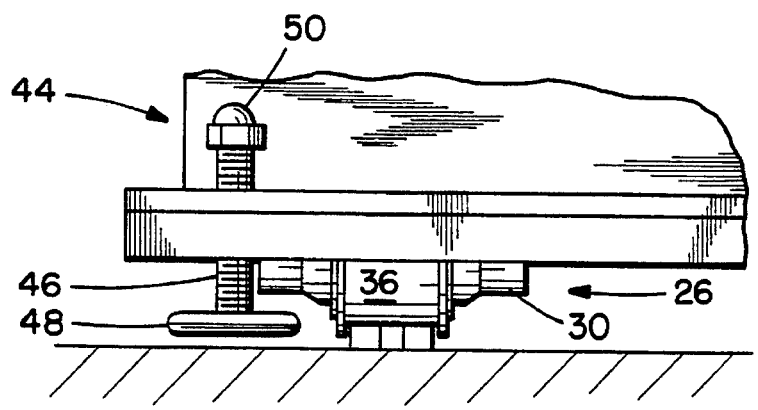
FIG. 2 is a partial front view of the left corner of the movable platform of FIG. 1.
Figure 3:
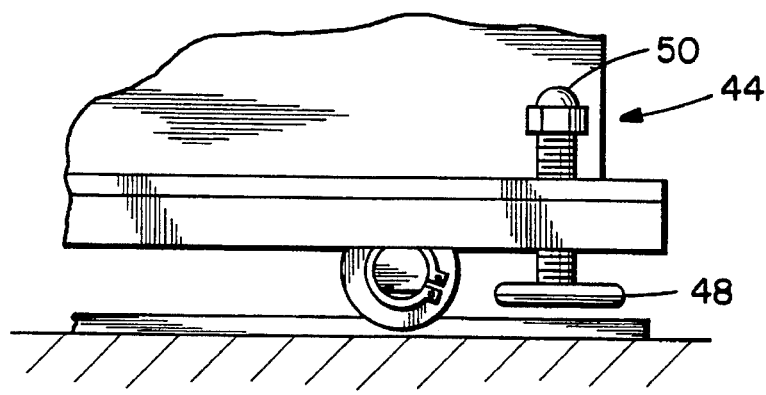
FIG. 3 is a partial side view of the platform of FIG. 1.
Figure 4:
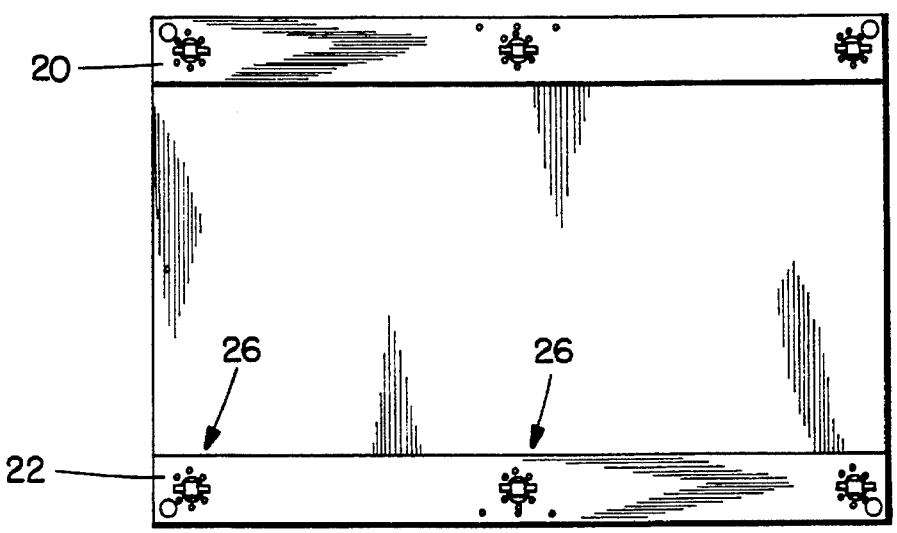
FIG. 4 is a bottom view looking upward of the movable platform.
Figure 5:
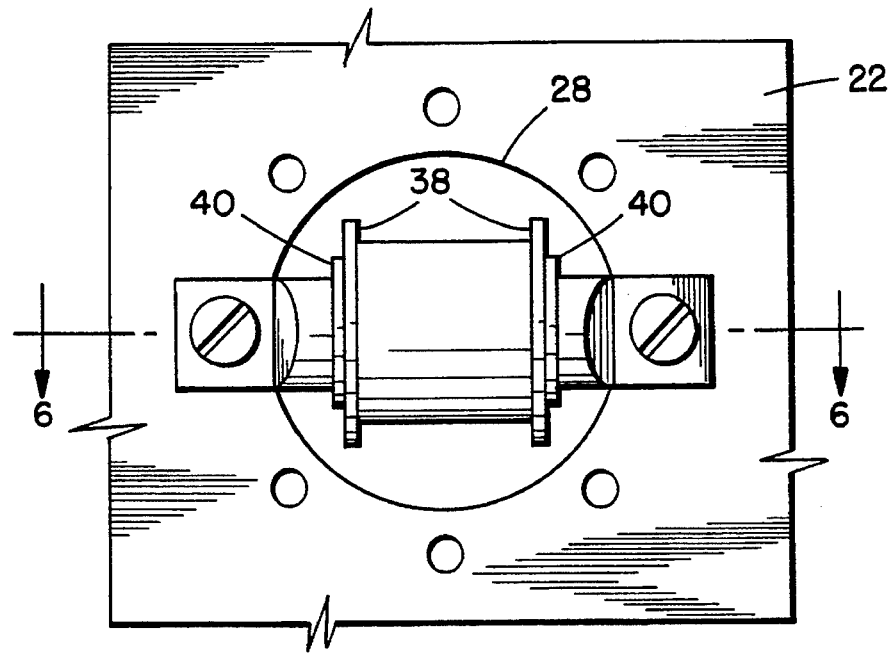
FIG. 5 is an enlarged bottom view of the roller assembly.

Referring now to the drawings and more particularly to FIG. 1, the movable platform of the present invention is generally designated 10 and is located in a corner defined by walls 12, 14. The platform support apparatus 16 which may, for example, comprise medical imaging equipment or business machinery. The platform comprises a flat horizontal platen 18 having a pair of supports 20, 22 secured to the undersurface at the forward and rearward edges thereof and extending the width of the platform.

Three tracks are provided each of which is segmented and has an initial track section 24 that supports the movable platform in its normal or permanent location.

Six roller assemblies 26 are provided two of which engage each of the track sections 24. The roller assemblies are more fully illustrated in FIGS. 2–8 where it is seen that each roller assembly has an associated opening 28 cut in the supports 20, 22. The assembly includes an axle 30 that has two flattened ends which receive machine screws 32 screw-threaded in respective tapped holes 34 in supports 20, 22. Each axle 30 supports a cylindrical wheel or roller 36 which is free to roll on its respective axle. A pair of roller guides in the form of washers 38 are also mounted on the axle at the two ends of each roller for a purpose to be hereinafter to be described. The roller 36 and associated pair of roller guides 38 are maintained in position on the respective axle by means of snap rings 40 secured in circular slots 42 on each axle.

It is seen then that each of the six roller assemblies comprises the axle 30 that is secured in place by machine screws 32 received in a pair of tapped holes 34 in each support 20, 22. The roller assemblies are located at the ends and mid-point of each of the support members. The axle 30 serves to maintain the roller 36, roller guides 38 in position by snap rings 40 received in slots 42. In the embodiment shown in FIG. 1, each of the six axles supporting their associated rollers are oriented so that the movable platform will move forward.

There is associated alongside of each roller assembly a leveling pad mechanism 44 which consists of a machine screw 46 having a pad 48 adapted to bear against the floor of the premises in which the unit is located. The machine screw 46 is screw-threaded through one of the support members 20, 22 and the platen 18 and terminates in an acorn nut 50 secured in any suitable manner to the end of screw 46. Thus by turning the nut 50 with a suitable wrench the leveling mechanism can be extended for the pad 40 to bear against the premises floor. It is readily seen that appropriate adjustment of the six leveling mechanisms will serve to level the moveable platform and the associated apparatus it supports.

Figure 6:
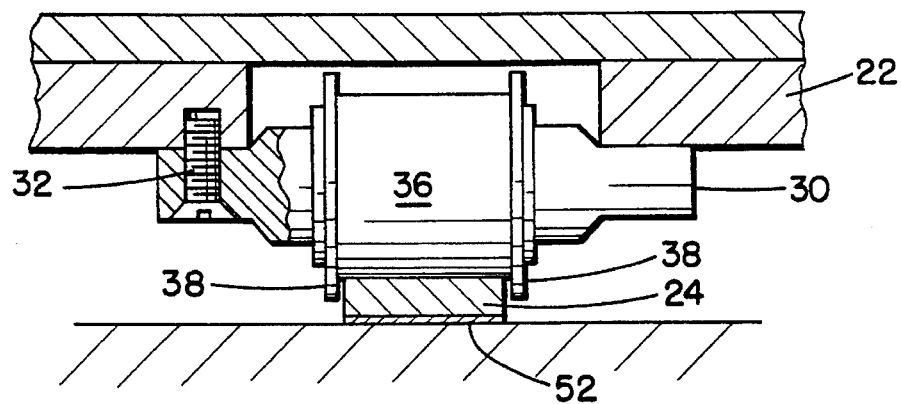
FIG. 6 is a section taken on the line 6—6 of FIG. 5.
Figure 7:
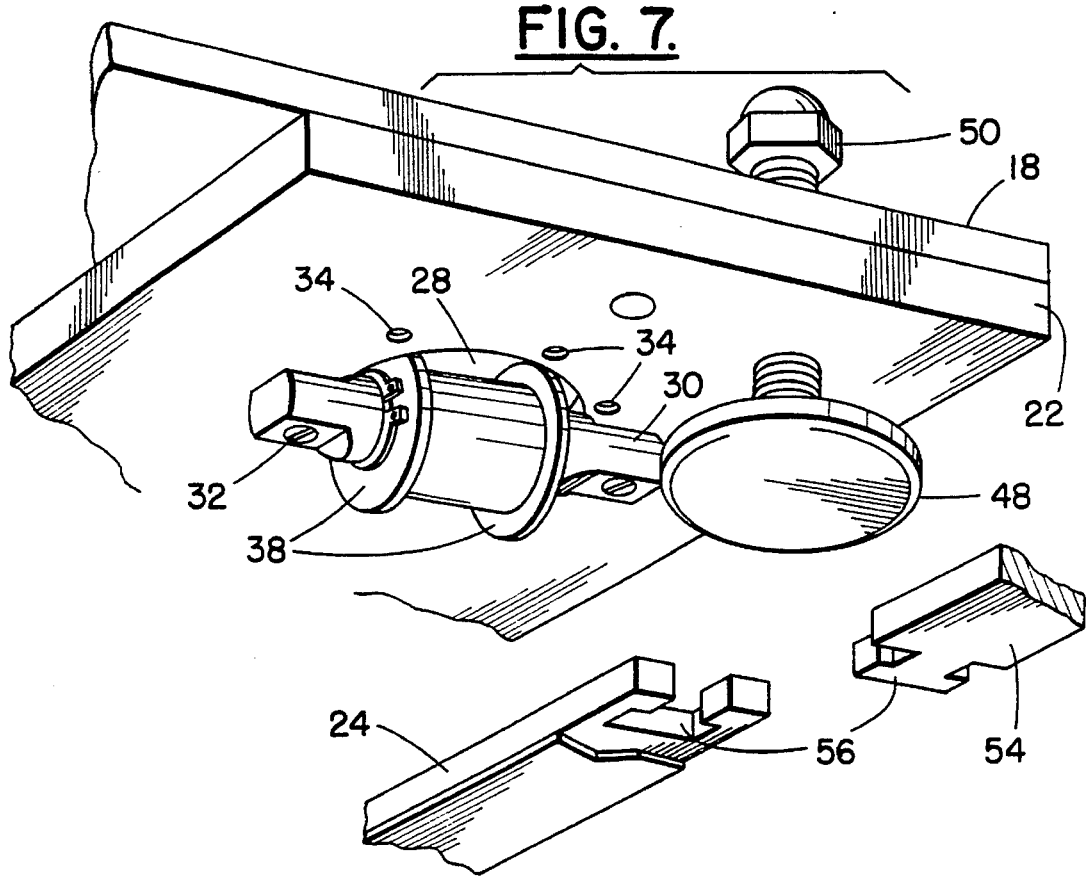
FIG. 7 is a partial perspective view looking upward from under the platform.
Figure 8:
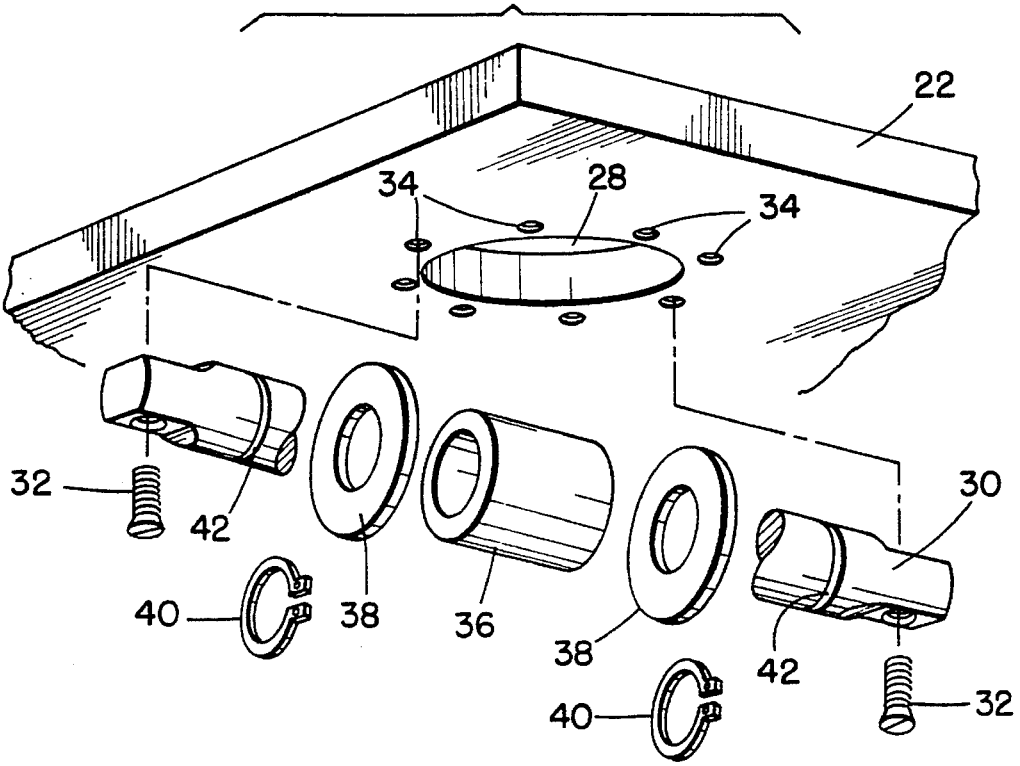
FIG. 8 is an exploded view of the roller assembly of FIG. 7.
Figure 12:
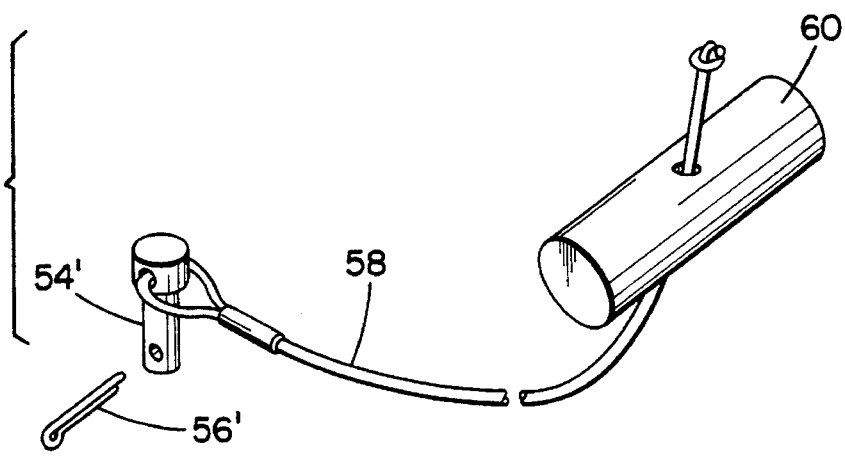
FIG. 12 is a perspective view of the handle mechanism.

When it is desired to move the apparatus supported on the movable platform, the leveling pads are raised and the rollers 36 will be lowered onto track segments 24. The tracks may be secured to the premises floor by strips of Velcro 52 as seen in FIG. 6 or by other suitable means. The rollers are, of course, retained on the tracks 24 by guidewashers 38. When it is desired to move the platform, track sections 54 are laid on the premises floor and connected to associated track sections 24 as seen in FIG. 1. The outer ends of track 24 and the inner ends of track 54 are joined by puzzle connection cutouts 56 so that the tracks are firmly and securely held in place. Thus as extension of the permanent track sections 24 are provided to permit the platform and its associated mechanism 16 to be conveniently rolled out from the corner of the premises in which it is located. The platform is provided with a handle mechanism shown in FIG. 12 to facilitate convenient movement. The mechanism comprises a pin 54 received in a hole in platen 18 and support strip 22. The bottom end of pin 54' receives a cotter pin 56' whereas the upper end receives one end of the cable or lanyard 58. The cable terminates in a handle 60 that may be readily and conveniently clasped to move the platform.

In the arrangement above described, it was desirable to move the platform forward out of the corner in which it is located. In some cases, it might be desirable to move the platform and associated apparatus to the left or right.

Figure 9:
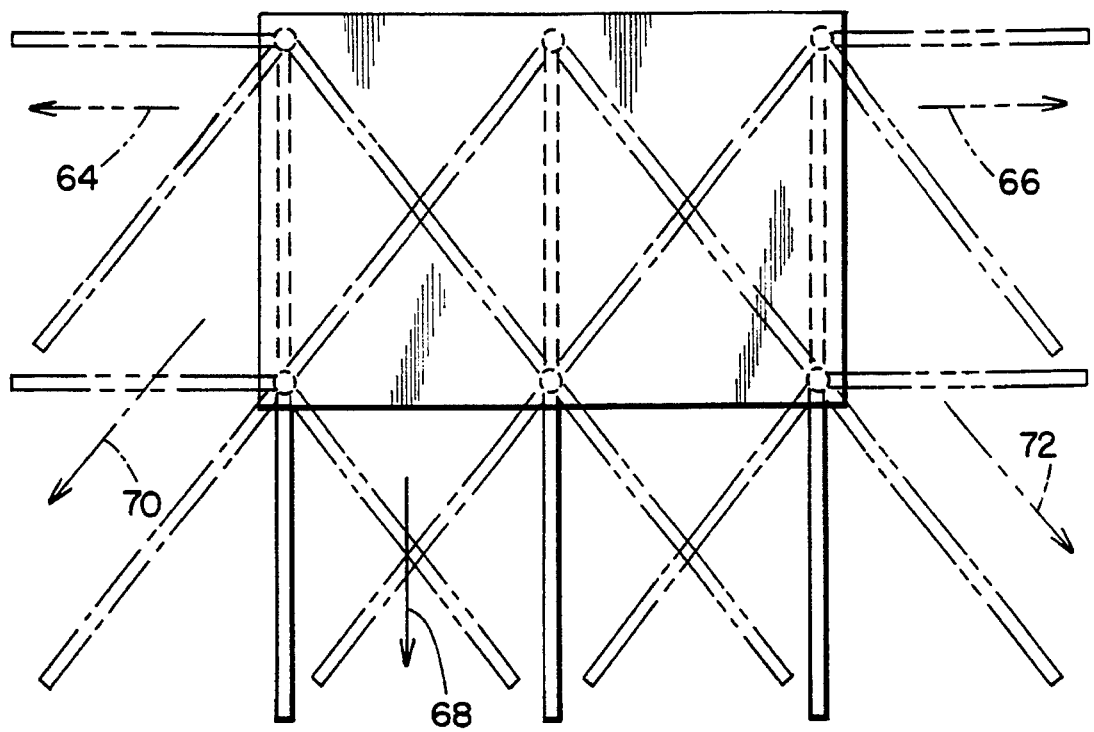
FIG. 9 is a top view illustrating the different angles of movement of the platform.
Figure 10:
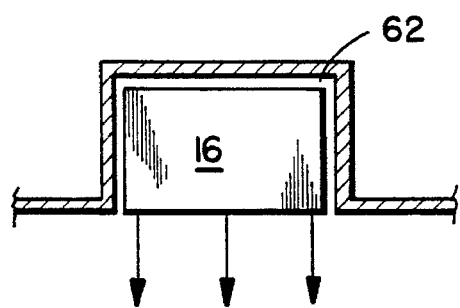
FIGS. 10 and 11 illustrate the platform and supporting apparatus located in different types of inaccessible locations.
Figure 11:
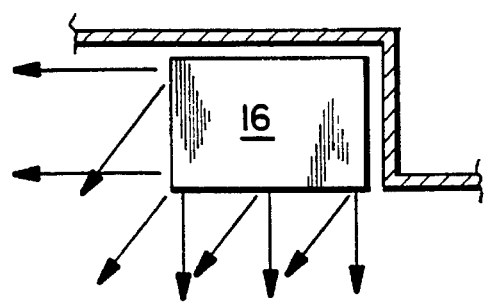

Referring to FIG. 11, it is seen that supported apparatus is located in a corner and the arrows indicate that it may be desired to move it forward or to the left or at a 45 degree angle. The direction could depend on other factors such as items located nearby or adjacent to the supported apparatus. In FIG. 10, the apparatus is located in a rectangle alcove 62 and would be accessed only by straight forward movement. FIG. 9 illustrates the various combinations of movement direction contemplated by the embodiment shown. That is, the platform movement may be to the left or to the right or forward as indicated by arrows 64, 66, and 68 respectively. Alternatively, it might be desirable to move the platform 45 degrees to the left as indicated by arrows 70 or to the right shown by arrow 72. The adaptability of the present design in permiting movement in various directions is achieved by the circular array of tapped holes 34 as more clearly seen in FIG. 8. Thus by chosing the appropriate pair of holes 34, the roller 36 may be oriented in any one of four positions to permit the platform to roll in any one of the four directions shown by FIG. 9. When a platform is chosen for a particular installation a decision is made on the desired direction of rolling and the axles of the roller assemblies are accordingly mounted in a pair of holes 34.

Figure 13:
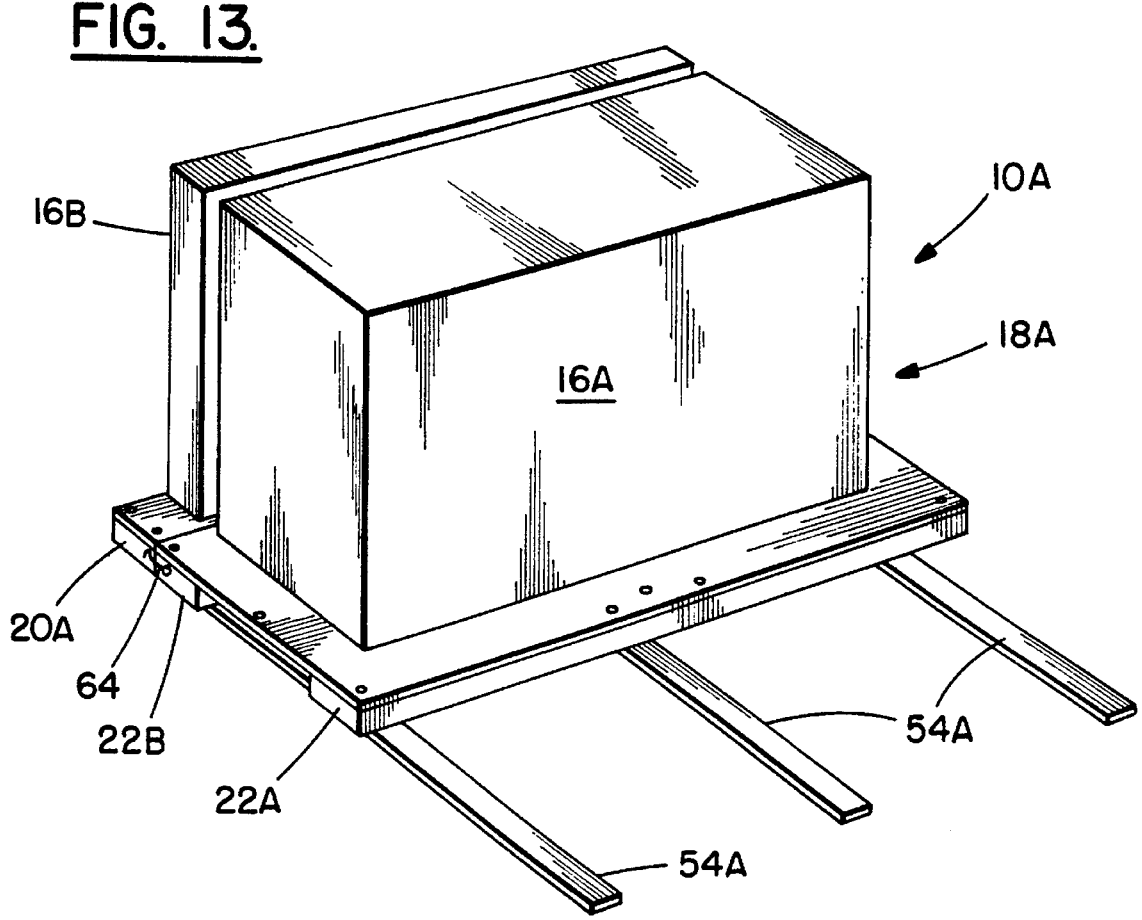
FIG. 13 is a perspective view of an alternative embodiment of the present invention employing a two section platform.
Figure 14:
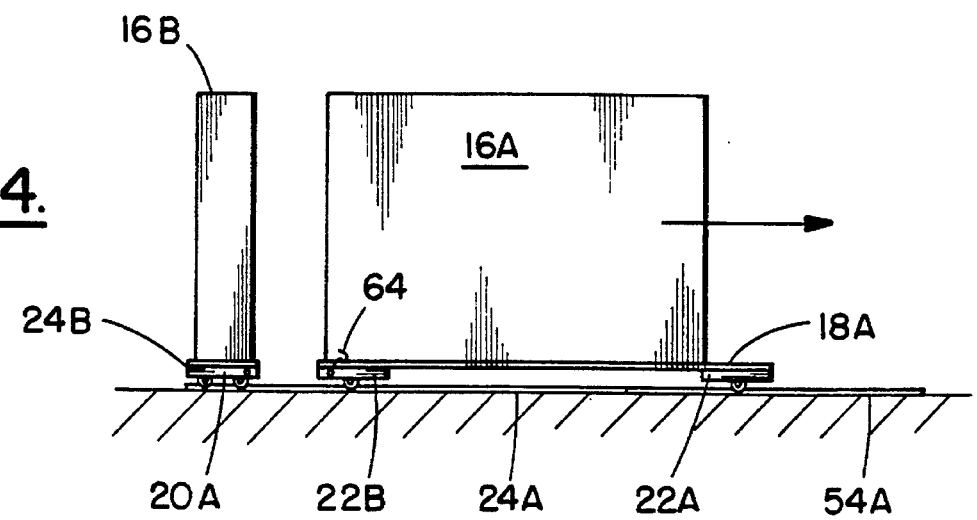
FIG. 14 is a side view of the embodiment of FIG. 13.

Referring now to FIGS. 13 and 14 there is shown a modified embodiment of the invention in which the movable platform is formed in two sections. The elements of FIGS. 13 and 14 that correspond to the above described elements are similarily numbered and carry the designation A. Thus the platform 10A has the support strips 20A and 22A which serve to mount roller assemblers of the type above described. However, in this embodiment the platen 18A is divided into two sections and an additional support strip 22B is provided. It is understood that in this embodiment it is contemplated that the supporting machinery consists of two sections 16A and 16B and in which case it may be desirable to move 16A out of its normal position leaving 16B in place. By separating the movable platform into two sections, this independent movement is achieved. Screw hooks 64 may be provided to hold the two sections of the movable platform together when in place. Then when it is desirable to move one section, the hooks are uncoupled and the forward section of the platform and its associated machinery 16A are moved to the more accessible location. In this embodiment, the supporting strip 20A may carry six roller assemblies for stability, and the additional strip 22B would carry three rollers to permit movement of the forward portion of the platform.

The various elements of the assembly may be fabricated of aluminum alloy material to provide strength and light weight.

Having thus described the invention with particular reference to the preferred forms thereof, it will be obvious that various changes and modifications may be made therein without departing from the spirit and scope of the invention as defined in the appended claims.

What is claimed is:

1. A movable platform system for supporting apparatus and moving it to an accessible location comprising:

a movable platform having a flat platen adapted to receive apparatus;

a plurality of parallel elongated support members secured to the underside of the said platen;

a plurality of roller assemblies secured to the underside of each support member;

each roller assembly comprising an axle;

a roller positioned on the axle;

a pair of roller guides on the axle at opposite sides of the roller;

said roller guides being of greater diameter than an associated said roller;

mounting means to secure each roller assembly to a respective said support member;

said mounting means being adjustable whereby the associated roller may be mounted in a plurality of predetermined positions to determine the direction of movement of the movable platform;

a plurality of parallel track sections positioned under the movable platform and each adapted to receive a plurality of said rollers;

the pair of roller guides associated with each roller extending on both sides of an associated said track section;

a plurality of track extension sections;

the adjacent ends of each track section and track extension section being formed in a puzzle connection to secure them together; and means to connect an associated said section to each tract section to provide a track to move said platform from a first location to a second location.

2. The system of claim 1 in which the mounting means includes a circular array of openings in the respective support member; and a pair of mounting screws passing through the ends of each axle and received in a predetermined pair of the said circular array of openings.

3. The system of claim 2 including a plurality of leveling pads adjustably secured to said flat platen to provide leveling thereof.

4. A movable platform system for supporting apparatus and moving it to an accessible location comprising:

a movable platform having a flat platen adapted to receive apparatus to be supported;

a plurality of parallel elongated support members secured to the underside of the said platen;

a plurality of roller assemblies secured to the underside of each support member;

each roller assembly comprising an axle;

a roller positioned on the axle;

a pair of roller guides on the axle at opposite sides of the roller;

said roller guides being of greater diameter than an associated said roller;

mounting means to secure each roller assembly to a respective said support member;

said mounting means including screw means passing through the ends of each axle;

a circular array of openings in the said support members to receive the screw means of an associated said axle whereby the associated roller may be mounted in a plurality of predetermined positions to determine the direction of movement of the movable platform;

a plurality of parallel track sections positioned under the movable platform and each adapted to support a plurality of said rollers;

the pair of roller guides associated with each roller extending on both sides of an associated said track section;

a plurality of track extension sections; and means to connect an associated said track extension section to each track section to provide a track to move said platform from a first location to a section location.

5. A movable platform system for supporting apparatus and moving it to an accessible location comprising;

a movable platform having a flat platen adapted to receive apparatus;

a plurality of roller assemblies;

mounting means to secure each roller assembly to the underside of the said platen;

each roller positioned on the axle;

a pair of roller guides on the axle at opposite sides of the roller;

said roller guides being of greater diameter than an associated said roller;

said mounting means to secure each roller assembly being adjustable whereby the associated roller may be mounted in a plurality of predetermined positions to determine the direction of movement of the movable platform;

a plurality of leveling pads adjustably secured to said flat platen to provide leveling thereof;

a plurality of parallel track sections positioned under the movable platform and each adapted to support plurality of said rollers;

the pair of roller guides associated with each roller extending on both sides of an associated said track section;

a plurality of track extension sections; and means to connect an associated said tract extension section to each track section to provide a track to move said platform from a first location to a second location.

6. The system of claim 5 in which the said mounting means includes a circular array of openings in the underside of the platen member; and a pair of mounting screws passing through the ends of each axle and received in a predetermined pair of the said circular array of openings.

7. The system of claim 6 in which the adjacent ends of each track section and track extension section are formed in a puzzle connection to secure them together.

* * * * *